United States Patent
Peck (10) Patent No.: US 8,908,493 B2
(45) Date of Patent: Dec. 9, 2014

(54) NC-OFDM FOR A COGNITIVE RADIO

(71) Applicant: SRC, Inc., North Syracuse, NY (US)

(72) Inventor: Jonathan Morgan Peck, Liverpool, NY (US)

(73) Assignee: SRC, Inc., North Syracuse, NY (US)

( * ) Notice: Subject to any disclaimer, the term of this patent is extended or adjusted under 35 U.S.C. 154(b) by 149 days.

(21) Appl. No.: 13/739,088

(22) Filed: Jan. 11, 2013

(65) Prior Publication Data

US 2013/0294219 A1 Nov. 7, 2013

Related U.S. Application Data (60) Provisional application No. 61/641,022, filed on May 1, 2012.

(51) Int. Cl.
*H04J 11/00* (2006.01)
*H04W 72/04* (2009.01)
*H04B 1/00* (2006.01)

(52) U.S. Cl.
CPC ......... *H04W 72/0453* (2013.01); *H04B 1/0053* (2013.01)
USPC .......................................... 370/208; 370/210

(58) Field of Classification Search
CPC ... H04L 5/0007; H04L 27/206; H04L 27/265; H04J 11/00
USPC .......................................... 370/203, 208, 210
See application file for complete search history.

(56) References Cited

U.S. PATENT DOCUMENTS

| | | | |
|---|---|---|---|
| 6,686,879 B2 | 2/2004 | Shattil | |
| 7,248,841 B2 | 7/2007 | Agee | |
| 7,355,960 B2 | 4/2008 | Kang et al. | |
| 7,376,075 B1 | 5/2008 | Petranovich et al. | |
| 7,430,257 B1 | 9/2008 | Shattil | |
| 7,466,960 B2 | 12/2008 | Sugar | |
| 7,593,449 B2 | 9/2009 | Shattil | |
| 7,633,900 B2 | 12/2009 | Hwang | |
| 7,639,597 B2 | 12/2009 | Shattil | |
| 7,835,319 B2 | 11/2010 | Sugar | |
| 7,965,761 B2 | 6/2011 | Shattil | |
| 2007/0202816 A1* | 8/2007 | Zheng | 455/91 |
| 2009/0135713 A1 | 5/2009 | Hwang et al. | |
| 2009/0190535 A1 | 7/2009 | Hassan et al. | |
| 2010/0216478 A1 | 8/2010 | Buddhikot et al. | |
| 2010/0316147 A1 | 12/2010 | Jee et al. | |

OTHER PUBLICATIONS

Carlos Cordiero, et al., 'IEEE802.22: An Introduction to the First Wireless Standard Based on Cognitive Radios', Journal of Communications, Apr. 2006, vol. 1. No. 1, pp. 38-47.

(Continued)

*Primary Examiner* — Brenda H Pham
(74) *Attorney, Agent, or Firm* — George R. McGuire; Bond Schoeneck & King, PLLC (57) ABSTRACT

The present invention is directed to a method for use in a cognitive radio. A Fourier transform of a time domain signal is performed to obtain a series of frequency domain samples covering substantially the entire predetermined RF spectrum, the time domain signal corresponding to the RF waveform, each frequency domain sample being characterized by a predetermined waveform characteristic. The predetermined waveform characteristic of each frequency domain sample is evaluated in each subcarrier block to obtain a subcarrier block activity level for each subcarrier block. A subcarrier block is selected when its subcarrier block activity level is greater than a predetermined threshold.

23 Claims, 9 Drawing Sheets

(56) References Cited

OTHER PUBLICATIONS

International Search Report Form PCT/ISA/220, International Application No. PCT/US2013/021151, pp. 1-5, dated Apr. 29, 2013.
Pu et al. "Improved Channel Estimation Algorithm for OFDM Over Leo Channels." Microwave, Antenna, Propagation and EMC Technologies for Wireless Communications, 2005. MAPE 2005. IEEE. Aug. 2005. vol. 2 pp. 1139-1142.
Yuan et al. "Feasibility of NC-OFDM transmission in dynamic spectrum access networks." Military Communications Conference, 2009. MILCOM 2009. IEEE Oct. 2009. pp. 1-5.
Zeydan et al. "Differential Space-Frequency Group Codes for MIMO-OFDM." 41st Annual Conference on Information Sciences and Systems, 2007. CISS '07. Mar. 2007. pp. 542-547.
Marques et al. "Optimizing Power Efficiency of OFDM Using Quantized Channel State Information." IEEE Journal on Selected Areas in Communications. Aug. 2006. pp. 1581-1592.
Ohlmer et al. "Algorithm for Detecting the Number of Transmit Antennas in MIMO-OFDM Systems Receiver Integration." Vehicular Technology Conference, 2008. VTC 2008-Fall. IEEE 68th., Sep. 2008 pp. 1-5.

* cited by examiner

NC-OFDM FOR A COGNITIVE RADIO

CROSS-REFERENCE TO RELATED APPLICATIONS

This application claims priority to U.S. Provisional Patent Application Ser. No. 61/641,022 filed on May 1, 2012 and entitled "NC-OFDM FOR A COGNITIVE RADIO," the entirety of which is hereby incorporated by reference.

STATEMENT REGARDING FEDERALLY SPONSORED RESEARCH OR DEVELOPMENT

This invention was made with government support under Contract No. W15P7T-06-D-E401 awarded by the US Army-CECOM. The government has certain rights in the invention.

BACKGROUND OF THE INVENTION

1. Field of the Invention

The present invention relates generally to wireless systems, and particularly to cognitive radio systems.

2. Technical Background

According to some reports, internet traffic has roughly doubled every year since 1997. At the same time, the public is becoming increasingly dependent on mobile telephones for voice, voice messaging, email and Internet access services. There is now therefore a huge demand for both wireless telephone devices and access to wireless service provided by the various wireless carriers.

All wireless signals propagate over the air via one or more radio frequencies. In layperson's terms, therefore, the term "spectrum" refers to all of the radio frequencies available for the transmission of voice, video, audio and other kinds of data over the air. Note that radio operators cannot transmit radio signals over the same frequencies at the same time because they would interfere with each other. Because of the demand for wireless services mentioned above, one of the biggest issues facing wireless carriers is the scarcity of available "spectrum."

It turns out that the Federal Communications Commission (FCC) has allocated various parts of the electromagnetic spectrum to various purposes such as AM radio, VHF television, cell phones, CB radio, and so on and so forth for large sums of money. For example, more than $19.0 billion was spent for space in the 700 MHz portion of the spectrum in a 2008 auction. At the same time, the explosive growth in wireless applications and devices mentioned above will only continue. Accordingly, the communications bandwidth is crowded and it is becoming increasingly difficult to find available spectrum for new services or for the expansion of existing services.

On the other hand, the FCC has recognized that depending on the location and the time of day, up to 70% of the licensed spectrum may be idle. In other words, after obtaining a license to use a block of the radio spectrum, many licensees only use their licensed block during certain times in the day; the remainder of the time the spectral blocks are idle. The FCC is therefore encouraging the development of cognitive radios and dynamic spectrum access (DSA) technology that would allow unlicensed users to use the idle spectrum without infringing the rights of the licensed users.

Cognitive radio is a term that refers to a wireless communication scheme wherein the wireless network or the wireless device can dynamically change its transmission and reception parameters without interfering with licensed incumbent users. Thus, cognitive radio promises to help solve the spectrum scarcity problem mentioned above. The fundamental means for implementing a cognitive radio framework or scheme is a software defined radio. As its name suggests, the software radio hardware is programmable such that transmission and reception parameters (frequency, power, modulation type, etc.) can be adjusted on the fly to provide dynamic access to available spectrum. Many cognitive radio schemes are configured to negotiate with other devices in the vicinity to gain access to the unused spectrum. One of the drawbacks associated with this approach is that the negotiation itself requires the use of overhead bandwidth and is thus inefficient. Moreover, the additional bandwidth required to accommodate the negotiation exacerbates spectral scarcity and is thus self-defeating.

What is needed therefore is a cognitive radio approach that dynamically determines which frequencies in the electromagnetic spectrum are idle without requiring any overhead. A cognitive radio is needed that can detect the portion of the spectrum that includes a transmitted message intended for the receiver. A cognitive radio is also needed that can dynamically map its transmissions into idle subcarrier blocks on a symbol-by-symbol basis.

SUMMARY OF THE INVENTION

The present invention addresses the needs described above by providing a cognitive radio that dynamically determines which frequencies in the electromagnetic spectrum are idle. The cognitive radio receiver of the present invention does not require any overhead to detect the portion of the spectrum that includes a transmitted message intended for the receiver. The cognitive radio transmitter of the present invention is also configured to dynamically map its transmissions into idle subcarrier blocks on a symbol-by-symbol basis.

The present invention is directed to a method for use in a cognitive radio configured to receive an RF waveform propagating in a predetermined RF spectrum, the RF spectrum having a plurality of predetermined channels. The method includes performing a Fourier transform of a time domain signal to obtain a series of frequency domain samples covering substantially the entire predetermined RF spectrum. The time domain signal corresponds to the RF waveform, and each frequency domain sample is characterized by a predetermined waveform characteristic. The series of frequency domain samples are divided into a plurality of subcarrier blocks, with each subcarrier block corresponding to one of the plurality of predetermined channels. The predetermined waveform characteristic of each frequency domain sample is evaluated in each subcarrier block to obtain a subcarrier block activity level for each subcarrier block. A subcarrier block is selected when its subcarrier block activity level is greater than a predetermined threshold. Selected subcarrier blocks are assembled into a message signal, the selected subcarrier blocks corresponding to non-contiguous channels within the plurality of predetermined channels.

In another aspect, the present invention is directed to a cognitive radio device that includes a receiver portion configured to receive an RF signal propagating in a predetermined RF spectrum, the RF spectrum having a plurality of predetermined channels. The receiver portion further includes a receive Fourier transformer configured to perform a Fourier transform of a time domain signal to obtain a series of frequency domain samples covering substantially the entire predetermined RF spectrum. The time domain signal corresponds to the RF waveform and each frequency domain sample is characterized by a predetermined waveform characteristic. An activity detector is configured to divide the series of frequency domain samples into a plurality of subcarrier blocks, each subcarrier block corresponding to one of the plurality of predetermined channels. The detector is also configured to evaluate the predetermined waveform characteristic of each frequency domain sample in each subcarrier block to obtain a subcarrier block activity level for each subcarrier block. The detector is further configured to select a subcarrier block when the subcarrier block activity level is greater than a predetermined threshold. A message reassembly portion is configured to assemble the selected subcarrier blocks into a message signal, the selected subcarrier blocks corresponding to non-contiguous channels within the plurality of predetermined channels.

In yet another aspect, the present invention is directed to a transmitter system that includes a transmit message assembly portion configured derive a transmission message signal from at least one input device. A spectrum sensing portion is configured to identify idle subcarrier blocks corresponding to non-contiguous channels within the plurality of predetermined channels. A mapping portion is configured to encode the transmission message signal into a series of transmit frequency domain samples and map each of the transmit frequency domain samples into an idle subcarrier block. A transmit Fourier transformer is configured to transform the series of transmit frequency domain samples into a time domain signal corresponding to a transmit RF waveform. A transmitter portion is configured to upconvert the time domain signal and transmit the transmit RF waveform.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

DETAILED DESCRIPTION

Figure 5:
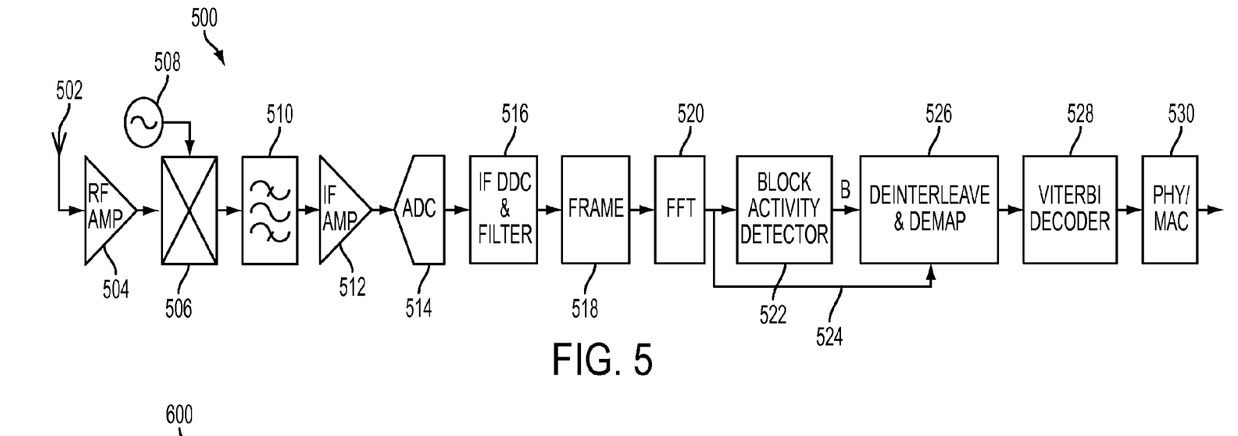
FIG. 5 is a block diagram of a receiver in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the cognitive radio receiver of the present invention is shown in FIG. 5, and is designated generally throughout by reference numeral 10.

Figure 1:
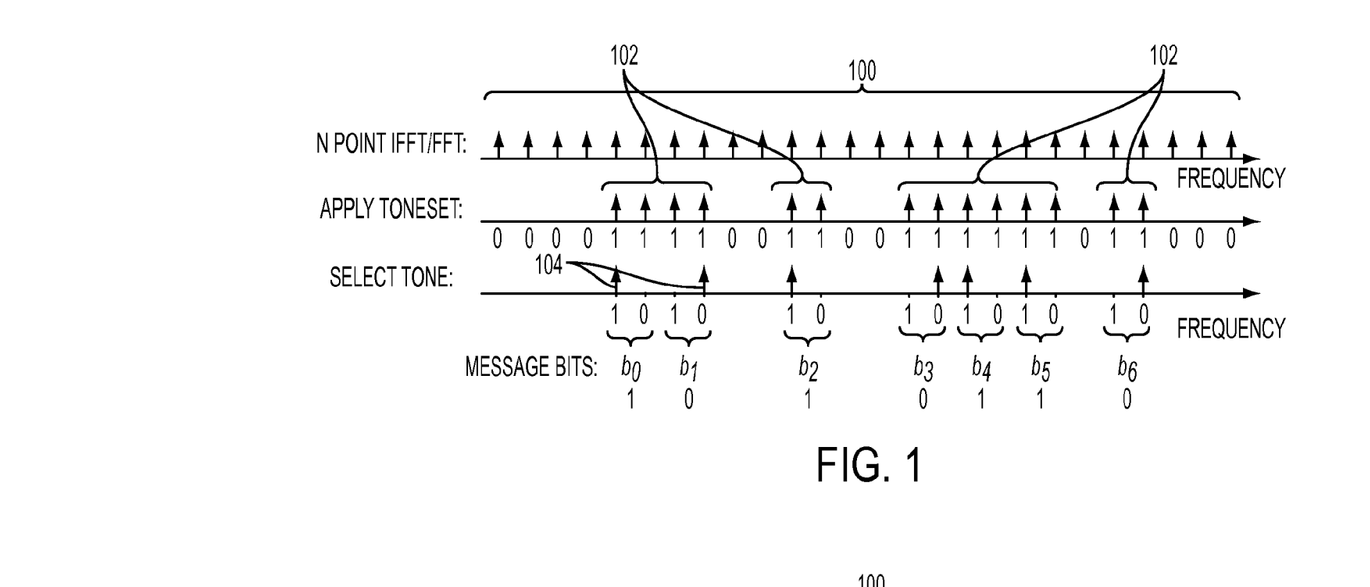
FIG. 1 is a diagrammatic depiction of a transmission scheme in accordance with an embodiment of the present invention.
Figure 2:
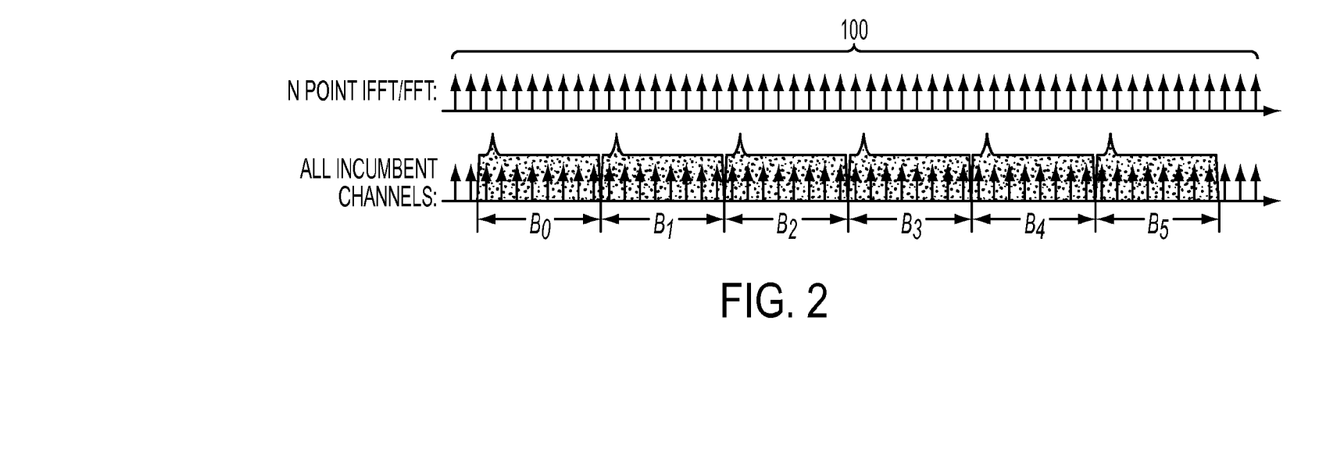
FIG. 2 is a diagrammatic depiction of subcarrier allocation blocks in accordance with an embodiment of the present invention.

As embodied herein and depicted in FIG. 1, a diagrammatic depiction of a transmission scheme in accordance with an embodiment of the present invention is disclosed. As shown in FIGS. 1 and 2, a system using Non-Continuous Orthogonal Frequency Division Multiplexing (NC-OFDM) is employed. Orthogonal Frequency Division Multiplexing (OFDM) is currently being used in a variety of applications such as Wi-Fi in the 2.4 GHz and 5 GHz ISM (Industrial Medical Scientific) bands. As persons skilled in the art will understand, Wi-Fi has a range of about 100 meters and is used to provide, e.g., Internet access to users at what are commonly referred to as a "hot spots." For example, coffee shops, book stores, cafes, etc. often have their own Wi-Fi network because it allows customers to enjoy a beverage or snack while they surf the net. OFDM is also being used in cellular radio communication systems which occupy predetermined frequency bands (i.e., spectrums) including 700 MHz, 800 MHz, 850 MHz, 1400 MHz, the PCS band and the AWS band. Finally, OFDM is also being employed in both digital radio applications as well as digital terrestrial television transmission systems. Those skilled in the art will appreciate that while one of the examples provided herein (i.e., FIG. 4) is directed to a digital television application, the present invention is equally applicable to any of the applications or frequency bands mentioned herein.

Orthogonal Frequency Division Multiplexing (OFDM) is becoming increasingly popular because of its ability to provide a series of closely packed orthogonal sub-carrier signals to propagate data in an efficient manner. Each sub-carrier is modulated using any suitable modulation scheme including frequency shift keying (FSK), quadrature amplitude modulation (QAM) or phase-shift keying (PSK) at a low symbol rate, maintaining total data rates similar to conventional single-carrier modulation schemes in the same bandwidth. OFDM-FSK, e.g., uses pairs of frequencies to encode a data bit. The first frequency in the pair is employed to encode a logic one ("1"), whereas the second frequency in the pair encodes a logic zero ("0"). In the OFDM-PSK or OFDM-QAM cases, one sub-carrier is modulated per bit. The present invention is directed toward the use of non-contiguous (NC) OFDM in a cognitive radio. In NC-OFDM, a message is transmitted over non-contiguous blocks of the spectrum (e.g., 700 MHz, 800 MHz, 850 MHz, 1400 MHz, the PCS band or the AWS band).

Referring back to FIG. 1, the entire spectral band is subdivided into subcarrier frequency bins 100 at the transmitter Inverse Fast Fourier Transformer (IFFT) or at the receiver's Fast Fourier Transformer (FFT) and the cognitive radio device detects portions 102 of the licensed spectrum that are available for use. The message bits ($b_0 \ldots b_n$) are modulated by the selected tones 104 as shown in the third spectrum of FIG. 1. In the OFDM-FSK case (See FIG. 4), each message bit is assigned to a pair of orthogonal frequencies and is modulated by selecting either the one (1) frequency or the zero (0) frequency depending on the bit value such that an NC-OFDM-FSK message is generated. Stated differently, after a serial-to-parallel operation, the IFFT converts the parallel input symbol sequence into a serial time domain symbol modulating each subcarrier with the appropriate selected tone (i.e., 1 or 0) such that the signal is comprised of N-mutually orthogonal subcarriers. The use of mutually orthogonal signals allows the system to simultaneously transmit and receive any number of different frequencies in a relatively small bandwidth. The number of different frequencies is, of course, any power of two (2) (e.g., 16, 32, 64 . . . 2,048, etc.). Stated briefly, orthogonal signals exist in the null of the other signals such that cross talk is substantially eliminated.

In reference to FIG. 2, a diagrammatic depiction of subcarrier allocation blocks in accordance with an embodiment of the present invention is disclosed. Like FIG. 1, the entire available spectrum is subdivided into subcarrier frequency bins 100 at the transmitter Inverse Fast Fourier Transformer (IFFT) or at the receiver's Fast Fourier Transformer (FFT). In the second spectrum line of FIG. 2, however, the subcarriers within the band are further divided up into incumbent blocks. In other words, the block $B_0$ may be licensed by an incumbent operator 0, block $B_1$ is licensed by an incumbent operator 1 and so on and so forth. In another example, each block may represent digital television frequency bands for the broadcasters. In these examples, the various incumbent bandwidths of the entire spectrum 100 is known á priori, what is not known is whether or not any given incumbent bandwidth is idle at any given time. In any event, the subcarriers mapped into the blocks ($B_0$, $B_1$ . . . $B_M$) must be continuous and match the incumbent's spectrum.

Figure 3:
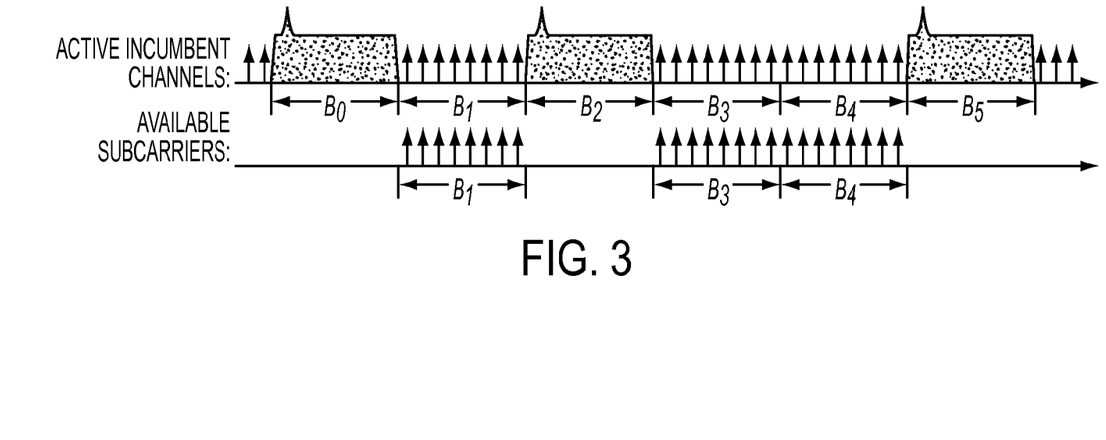
FIG. 3 is a diagrammatic depiction of dynamic allocation of the subcarrier allocation blocks depicted in FIG. 2.

In reference to FIG. 3, a diagrammatic depiction of the dynamic allocation of the subcarrier allocation blocks depicted in FIG. 2 is disclosed. In this view, the shaded blocks represent incumbent blocks that are unavailable for use by a secondary user. Thus, the available subcarriers modulated using any of the techniques mentioned herein (E.g., FSK, PSK or QAM) are mapped into blocks B1, B3 and B4 as shown. This information is passed to the transmitter such that subsequent transmissions do not interfere with the incumbent channels that are known to be in use.

Figure 4:
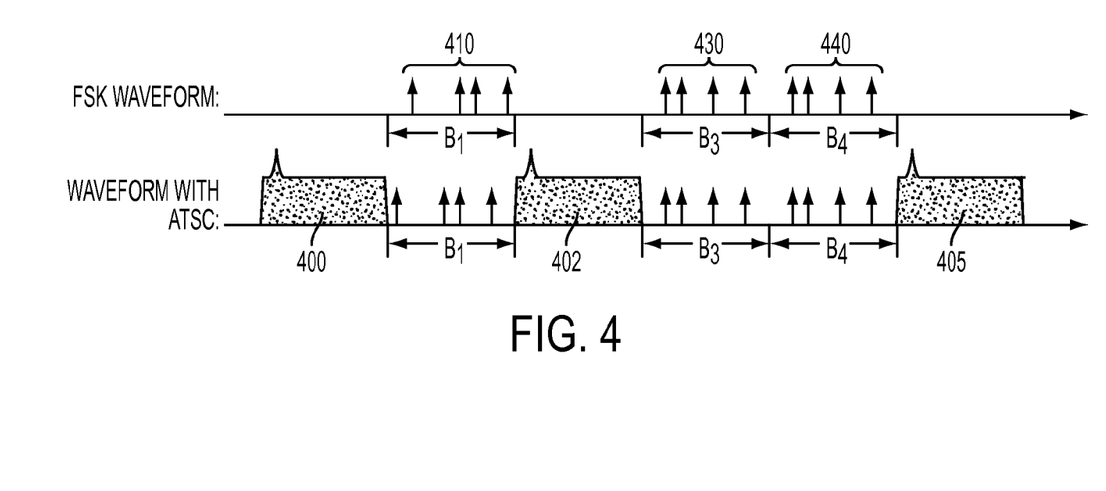
FIG. 4 is a diagrammatic depiction showing FSK waveforms within the subcarrier blocks dynamically allocated in FIG. 3.

In reference to FIG. 4, a diagrammatic depiction showing NC-OFDM-FSK waveforms within the subcarrier blocks dynamically allocated in FIG. 3 is disclosed. In this view, the spectrum is organized per the Advanced Television Systems Committee (ATSC). As noted above, the teachings of the present invention are not limited to this application but may be applied to any of the applications described herein and, indeed, to any suitable communications system. In one example, after the available bandwidth blocks are detected by the receiver, the transmitter portion of the present invention can perform FSK modulation of the message bits (as shown in the first frequency line of FIG. 4). Alternatively, the device (See, e.g., FIG. 14) can obtain idle channel information via an ATSC website or some other suitable Internet web page. In any event, the FSK waveform is applied to the available subcarriers within blocks B1, B3 and B4. The second spectrum of FIG. 4 shows the dynamically allocated non-contiguous orthogonal frequency division multiplexed (NC-OFDM-FSK) sub-carriers relative to the incumbent blocks. Those skilled in the art will appreciate that the present invention is not limited to FSK, but may also be implemented using PSK and QAM techniques.

As embodied herein and depicted in FIG. 5, a block diagram of a receiver 500 in accordance with the present invention is disclosed. The receive side 500 typically includes an antenna 502 coupled to a low noise amplifier (LNA) 504. The LNA 504 is further coupled to a down converter assembly that includes an oscillator 508 and a multiplier 506. The down conversion assembly shifts the received signal from the RF frequency band (e.g., 700 MHz, 800 MHz, 850 MHz, etc.) to an intermediate frequency (IF). The IF signal is directed through bandpass filter (BPF) 510 and then amplified (512). The BPF 510 filters out of band signals adjacent to the IF to prevent receiver saturation. The filter and amplified IF signal is digitized by the analog to digital converter (ADC) 514 and downconverted by the digital downconverter and filter block 516 into a baseband signal. Those skilled in the art will appreciate that the so-called receiver front end, comprising blocks 502-516, can be implemented in various ways depending on the application, and the frequency band of the application.

Turning back to FIG. 5, the framing block 518 is configured to recover timing information from the digital signal. The digital samples are stored in a frame such that the message content can be recovered properly. Stated differently, the digital samples are stored on a frame-by-frame basis to properly reconstruct a time domain signal and are then directed into a Fast Fourier Transform (FFT) block 520, which converts the time domain signal into a frequency domain signal. The frequency domain signal 524 is directed into the block activity detector 522 and the de-interleaving and de-mapping block 524. The block activity detector 524 is described below in greater detail. See FIG. 7. As described herein, the OFDM signal that the receiver is "listening" for is typically spread over many non-contiguous spectral blocks B within the frequency band. See, e.g., FIGS. 3-4 above. Essentially, the block activity detector identifies the blocks wherein the OFDM data is present, and the "demapper" 526 assembles the various blocks or data together into a single message that is directed to the Viterbi decoder 528. The Viterbi decoder 528 performs error correction decoding to obviate transmission errors due to channel noise; but those skilled in the art will understand that other types of error correction coding and decoding can also be employed herein. The decoded data is subsequently directed into block 530 which performs signal processing and the like. At this point, the receiver determines whether or not the transmitted message is addressed to it and provides the message to the user in a suitable form (audio, text, email, etc.).

Figure 6:
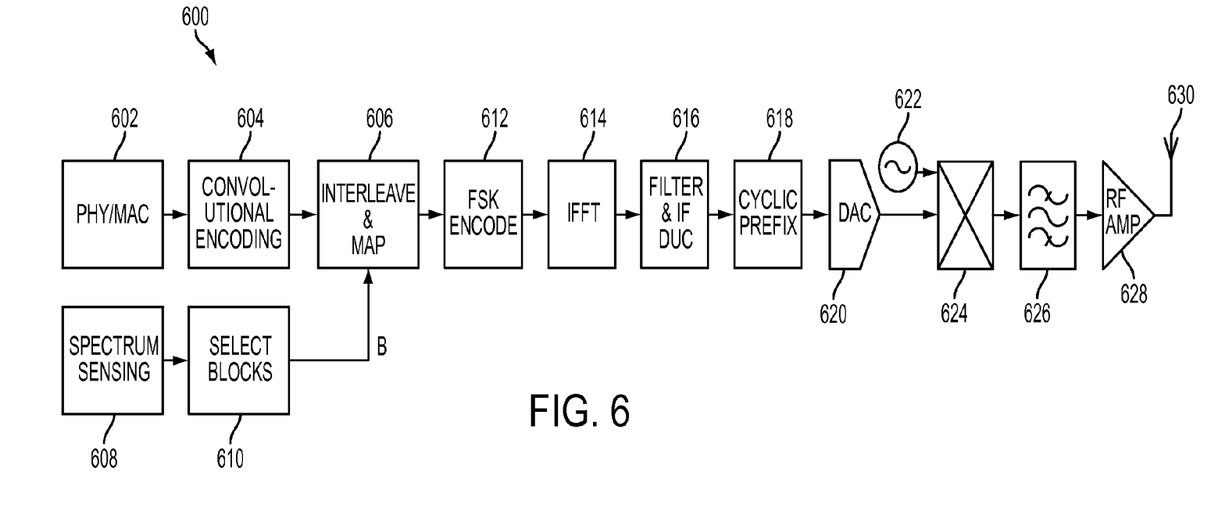
FIG. 6 is a block diagram of a transmitter in accordance with the present invention.

As embodied herein and depicted in FIG. 6, a block diagram of a transmitter 600 in accordance with the present invention is disclosed. In block 602, the message is created. Again, the message can be voice, text, email, etc. In block 604, error correction encoding is applied to the message and the encoded message is directed to the interleaving and mapping block 606. Note that the spectrum sensing and block selection blocks 608-610 are in parallel with blocks 602-606. The spectrum sensing block 608 is used to identify the non-contiguous blocks within a spectrum (e.g., 700 MHz, 800 MHz, 850 MHz, etc.) that are not being used by incumbent users and are thus available for use by a secondary user.

The spectrum sensing block may be implemented using any suitable means based on the manner in which the present invention is employed. For example, the present invention may be employed in a "push-to-talk" radio application whereby users communicate via a point-to-point communication link. For example, the users may be travelling in separate vehicles, or the link may be between a vehicle and a stationary user, or both users may be in stationary locations. In one embodiment of the present invention, the receiver block activity detector 522 is used to sense the spectrum available for use. The communications device 10 is placed in a listening mode such that the receiver 500 scans the spectrum to determine which blocks are idle. As described below in relation to FIGS. 7-10, the receiver 500 can identify the blocks that are unused and thus available for use. See, e.g., FIG. 8. Blocks 810 and 830 are available whereas blocks 820 and 840 as being used by other secondary users. Moreover, the receiver is also configured to identify spectral segment 801 as being used by an incumbent user. In another embodiment of the invention, the radio device may be preprogrammed prior to use by accessing a database that identifies idle spectral blocks open for use during the trip. For example, databases maintained by groups such as the ATSC may provide such information regarding where and when the spectrum licensed by their incumbent members may be idle. Moreover, devices equipped with GPS devices may be programmed to hop between available frequency blocks as the vehicle travels from one location to the next. In any event, the spectrum sensing and block selection circuits supply the interleave and mapping block 606 with data corresponding to idle and open spectral blocks.

Referring back to FIG. 6, the frequency block information, which may identify several non-contiguous frequency blocks, is used by the modulator (E.g., FSK, PSK or QAM) to apply the selected tones (See, e.g., FIG. 1) to the message data. In block 614, the IFFT transforms the frequency domain signals into digital time domain signals. The time domain signal is subsequently filtered and upconverted to an IF digital time domain signal. The IF digital signal is provided to the cyclic prefix block which adds a prefix to the message. The cyclic prefix is used to make the received signal time-invariant to substantially obviate inter-symbol interference. In block 620, the digital signal is converted into an analog signal by a digital to analog converter (DAC) and translated in frequency (i.e., upconverted) to the RF frequency band (i.e., 700 MHz, 800 MHz, 850 MHz, etc.) by the upconverter assembly. The upconverter assembly is comprised of the oscillator 622 and mixer 624. The upconverted signal is filtered by the BPF 626 to remove unwanted emissions. The signal is amplified and propagated over the air by the antenna 630.

In summary, the transmitter of the present invention does not require an allocation vector to be sent to it by a control channel. The transmitter is free to instantaneously change which subcarrier blocks it is using for transmission based only on the input from the spectrum sensing block. This technique allows for very rapid changes in spectrum usage to avoid incumbent users. Using the subcarrier block detection scheme a transmitter can change the transmit subcarrier block literally on a symbol-by-symbol basis. This is something that cannot be accomplished using prior techniques.

Figure 7:
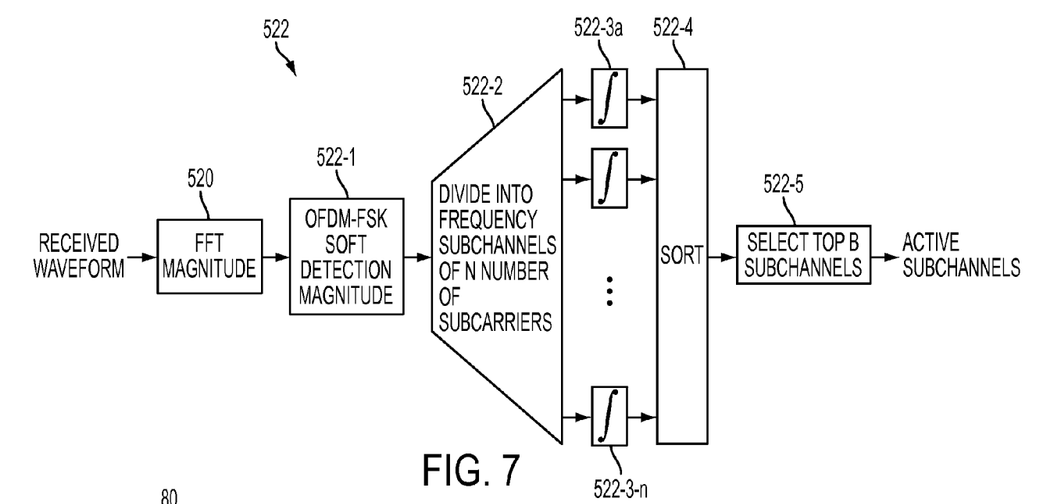
FIG. 7 is a block diagram of a portion of the receiver depicted in FIG. 5 in accordance with the present invention.

As embodied herein and depicted in FIG. 7, a block diagram of the receiver portion 522 depicted in FIG. 5 is disclosed. Again, the received waveform (from the framing block 518) is directed into the FFT 520 and transformed into the frequency domain using the FFT. The N-point FFT block includes N-bins corresponding to each sub-carrier in the RF spectrum of interest. Stated differently, the FFT block 520 measures the magnitude of each sub-carrier frequency in the entire spectral band (e.g., 700 MHz, 800 MHz, 850 MHz, etc.). The magnitude values are used by the OFDM-FSK soft detection block 522-1 to obtain a soft decision value for each pair of sub-carrier frequencies. See FIG. 9. The soft decisions are generated by measuring the difference in amplitude of the FSK frequency pairs.

As mentioned above, the incumbent blocks of the entire spectrum 100 are known a priori. In the example of FIG. 4, the ATSC knows which incumbent broadcasters use each bandwidth block ($B_0$, $B_1$ ... $B_N$) in the spectrum. Thus, the demultiplexer 522-2 may be pre-programmed to partition the subcarrier frequency bins 100 based on the ATSC mapping of the bandwidth blocks ($B_0$, $B_1$ ... $B_N$). Those skilled in the art will appreciate that this mapping function is applicable to any frequency band in any application including radio, cellular telephone, etc. and may be programmable and reprogrammable as needed.

In any event, all of the soft-decision values for each subcarrier pair in a given bandwidth block are directed to a corresponding integrator 522-3a-522-3n. The magnitudes of the soft decisions are then integrated over the entire subchannel such that the soft-decision values from block $B_0$ are directed into integrator 522-3a, the soft-decision values from block $B_1$ are directed into integrator 522-3b, and so on and so forth. The resulting value for each block is treated as a probability that the subchannel is active. The integration provides a gain proportional to the number of subcarriers within the subchannel. The integrated probability values are then directed into the sorter 522-4 to determine which sub-carrier blocks are active. The selector block 522-5 uses a predetermined criterion, such as a threshold detector, to determine which blocks are active and which are deemed to be inactive. The data received from the active subchannels can subsequently be processed by the device's signal processing circuitry 530 and software as appropriate.

Figure 8:
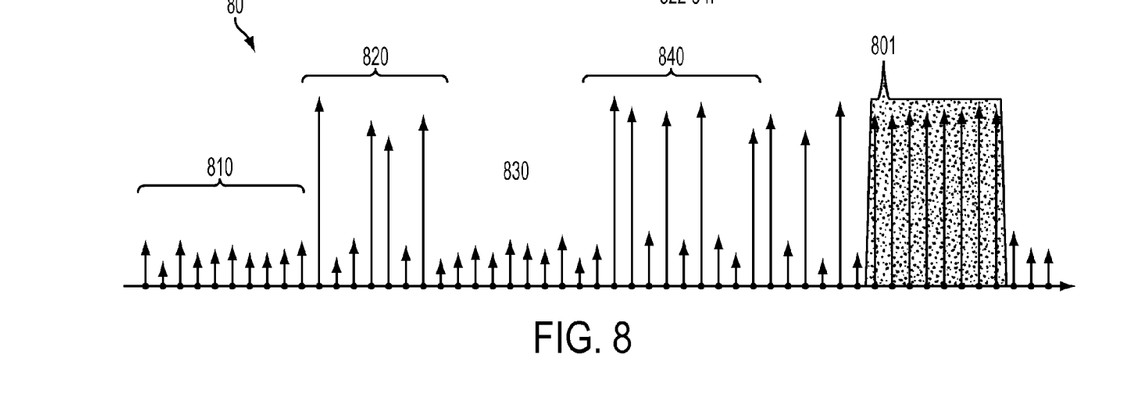
FIG. 8 is a diagrammatic depiction of the waveform received by the receiver shown in FIG. 7.

In reference to FIG. 8, a diagrammatic depiction of the waveform received by the receiver and FFT block 520 is shown. As noted above, blocks 810 and 830 are shown to be inactive whereas blocks 820 and 840 are shown to be transmitting OFDM signals. Block 801 is an incumbent block that is being used by the incumbent carrier. Thus, instead of the transmitter sending information regarding the active subcarriers (via overhead) the receiver detects the active subcarriers blocks.

Figure 9:
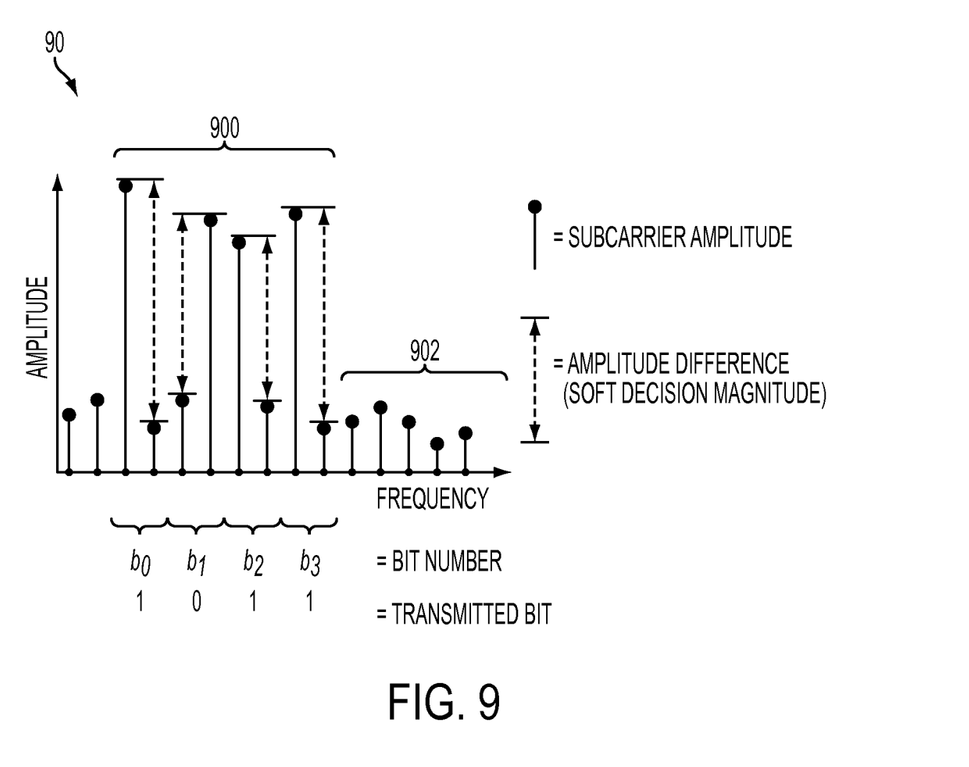
FIG. 9 is a diagrammatic depiction of the soft detection process employed in the receiver portion shown in FIG. 7.

Referring to FIG. 9, a diagrammatic depiction of the soft detection process 90 employed in block 522-1 of the receiver portion 522 is depicted. In this embodiment, OFDM-FSK demodulation is performed by comparing the two frequencies that comprise each subcarrier pair. The subcarrier frequency that represents a "one" ($f_1$) is compared with the subcarrier frequency ($f_0$) that represents a "zero." In reference to bit $b_0$, the amplitude difference ($f_1-f_0$) is shown to be a positive value that is greater than a predetermined threshold value and thus deemed to be equal to a message bit having the value of one (1). Next, bit $b_1$ is seen to be equal to zero (0), and so on and so forth. Moreover, the entire block of frequencies indicate that an OFDM transmitter is active. On the other hand, the magnitude of the difference of the subcarriers in bandwidth portion 902 indicates that portion 902 is inactive. Stated briefly, in FSK schemes, soft decisions are generated by taking the difference of the magnitude of the "one" subcarrier and the "zero" subcarrier over the entire spectrum 90 to determine which spectral blocks are active. In PSK schemes, the soft detection is performed by analyzing the phase of the signal. In QAM schemes, both phase and magnitude are employed in the detection process.

Figure 10:
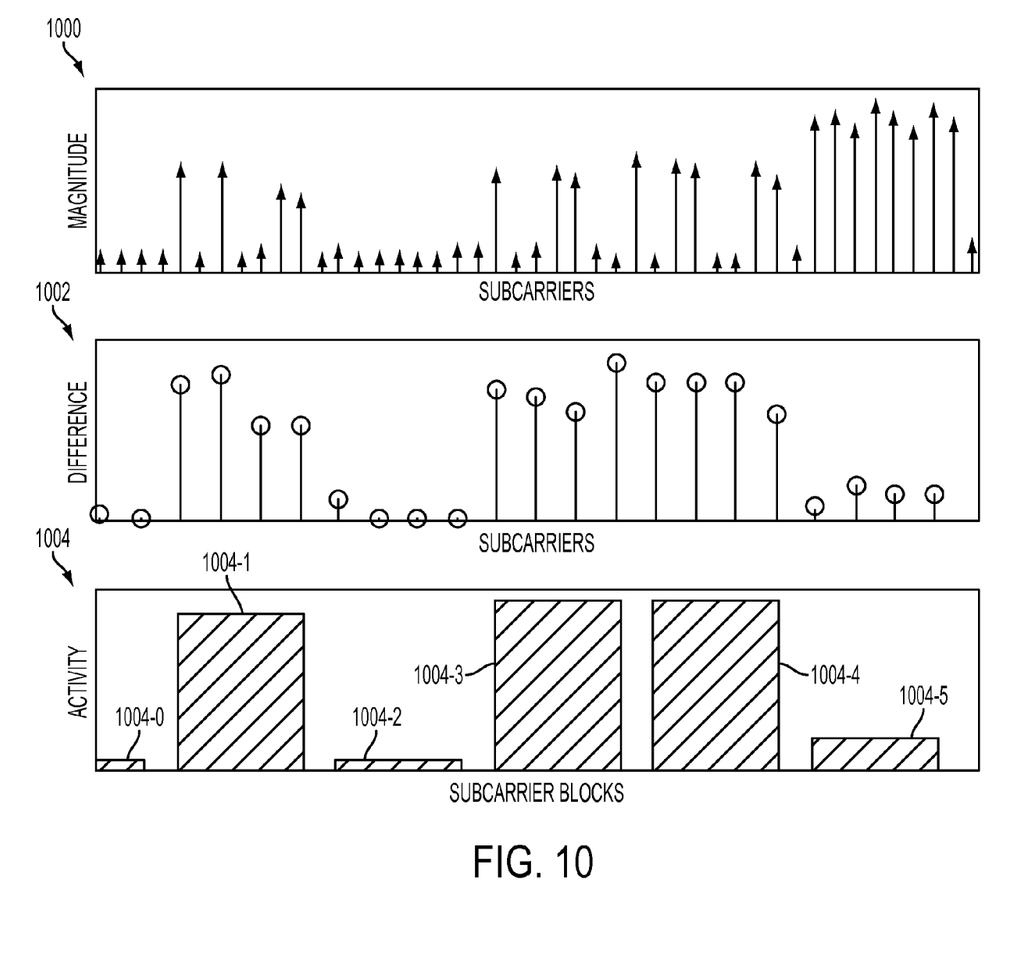
FIG. 10 is a chart showing the soft detection and integration activity performed by the receiver portion shown in FIG. 7.

Referring to FIG. 10, the operation of the FFT block 520, OFDM block 522-1, demutliplexing 522-2 and the integration function 522-3 are shown together to illustrate the activity in the spectrum 100. The first plot 1000 shows the measurement of the magnitudes of each subcarrier frequency; this line is the same or similar to the spectrum shown in FIG. 8. The second plot 1002 shows the difference values for each subcarrier frequency pair (Line 1002 is similar to FIG. 9). The last plot 1004 in FIG. 10 illustrates the functionality of the multiplexer 522-2 and the integrator blocks 522-3 of the receiver. Based on the integration results for integrators 522-3a and 522-3c, there is deemed to be no secondary channel activity in subcarrier blocks 1004-0 and 1004-2. Conversely, integrators 522-3b, 522-3d and 522-3e show that there is secondary channel activity in those blocks labeled 1004-1, 1004-3 and 1004-4. The last block 1004-5 shows that there is also no secondary channel activity used by cognitive radio; however plot 1000 shows that there is incumbent channel activity. The present invention can detect the incumbent channel activity in block 1004-10 by using the magnitude information in plot 1000 or by á priori information obtained during pre-programming as described above. Alternatively, if the integrators 522-3 determine that the signal power detected in block 1000 (that correspond to block 1004-10) are not secondary NC-OFDM transmissions, it can be assumed that they incumbent transmissions.

It will be apparent to those of ordinary skill in the pertinent art that modifications and variations can be made to the block activity detector 522 of the present invention depending on the type of modulation scheme that is employed by the communications device. For example, the principles that are used for block activity detection can be extended to any form of modulation that employs a soft detection scheme such as PSK or QAM. In binary phase shift keying (BPSK), a one ("1") and a zero ("0") are represented by two phases separated by 180 degrees. Thus, the soft decision magnitude is based on the proximity of the subcarrier signal to these phases. The magnitude of the soft decisions made on multiple subcarriers can be integrated over multiple subcarriers that are within a block to produce a measure of activity in the same way that was used for FSK. This also extends to QAM where soft decisions are based on proximity in both phase and amplitude.

Figure 11:
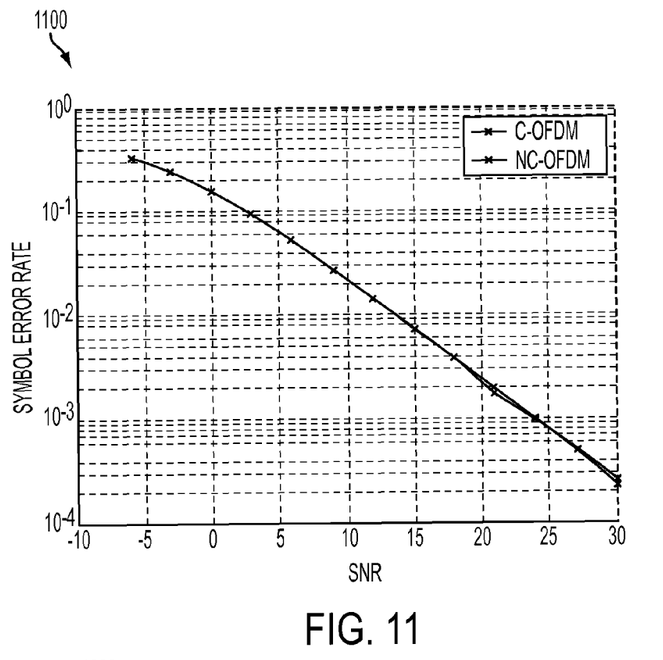
FIG. 11 is a chart showing the performance of NC-OFDM when the active subcarriers are known a priori.

FIG. 11 is a chart showing the performance of NC-OFDM when the active subcarriers are known á priori. This chart thus illustrates the scenario wherein the device accesses a database to obtain non-contiguous frequency block data before operation. NC-OFDM performance is comparable with continuous OFDM under these circumstances. When the signal-to-noise ratio is poor (See the top left hand corner of the chart), the symbol error rate (SER) is also poor as expected. The SER improves as the SNR improves such that the there is almost one error in every 10,000 symbols received as the SNR approaches 30.

Figure 12:
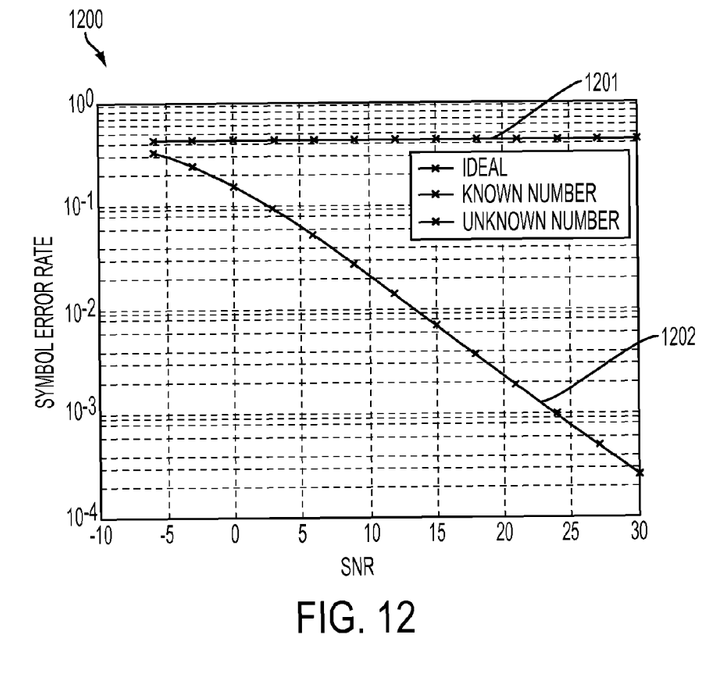
FIG. 12 is a chart showing the performance of NC-OFDM when the active subcarriers are not known and the detector is sub-optimal.

FIG. 12 is a chart showing the performance of NC-OFDM when the active subcarriers are not known and the activity detector is not present. Under these conditions the performance of the NC-OFDM receiver drops. Stated differently, if the receiver does not know where to find the OFDM data, it will not detect much. The receiver performance at plot 1201 shows that almost every detected symbol is erroneous (SER≈10°). The performance of the receiver is thus dependent upon the block activity detector 522 depicted in FIGS. 5 and 7.

Figure 13:
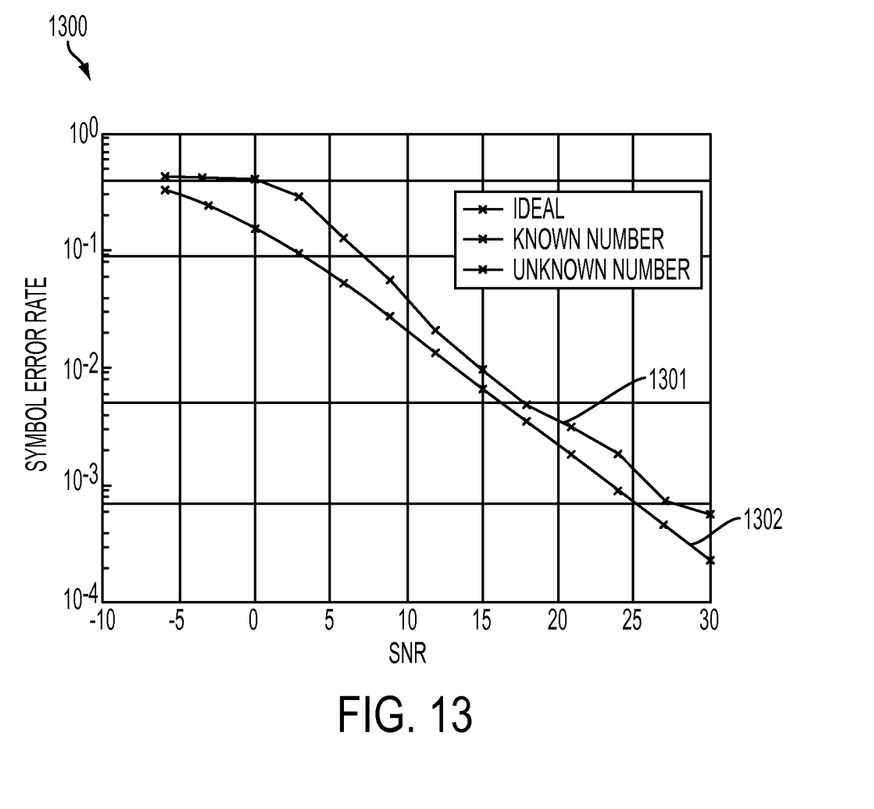
FIG. 13 is a chart showing the performance of NC-OFDM when the active subcarriers are not known and an active block detector in accordance with the present invention is employed.
Figure 14A:
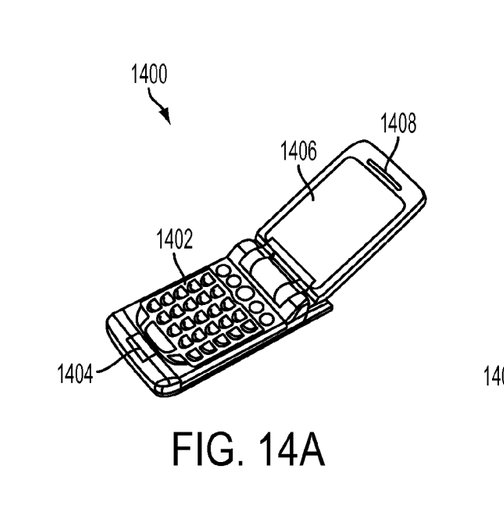
FIGS. 14A-D are directed to perspective views of various types of cognitive radio devices.
Figure 14B:
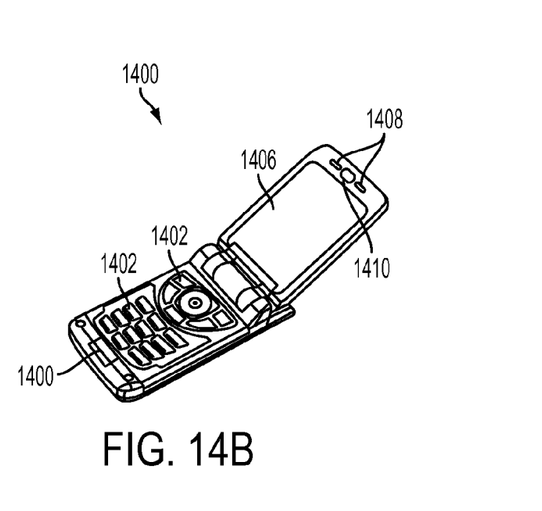
Figure 14C:
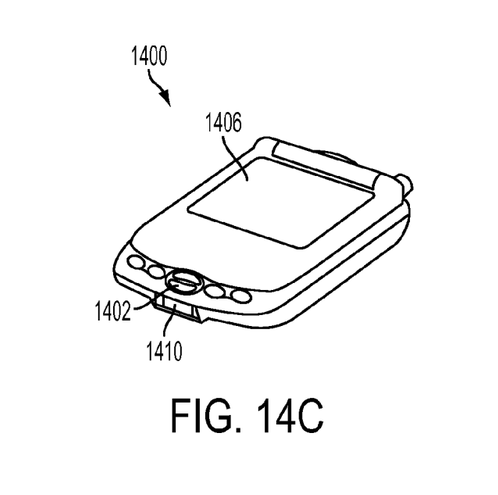
Figure 14D:
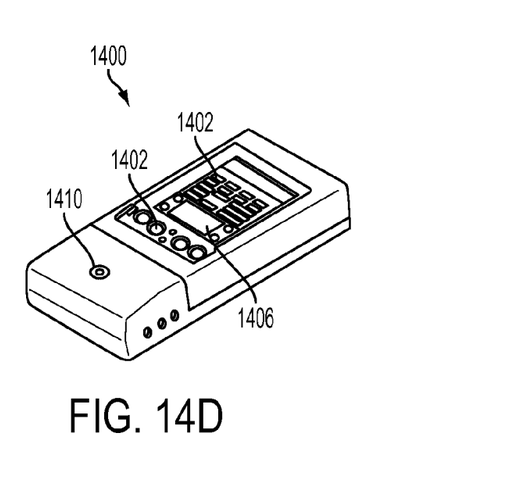

FIG. 13 is a chart that shows the performance of NC-OFDM when the active subcarriers are not known á priori, but when the block activity detector 522 in accordance with the present invention is employed. In the first plot 1301, the block detector only calculates the average power associated with each subcarrier. This is akin to plot 1000 in FIG. 10. Stated differently, the detector does not use the soft detection process (as shown in plot 1002 of FIG. 10). Thus, it may attempt to decode incumbent channel data. As such, the performance of the plot 1301 is inferior to plot 1302 which does employ the soft detection used by the block activity detector 522 of FIGS. 5 and 7. In fact, plot 1302 shows that the performance of the receiver 500 using the detector 522 is virtually identical to the plot shown in FIG. 11 wherein the non-contiguous channels are known beforehand.

In reference to FIGS. 14A-D, various types of cognitive radio devices 1400 are depicted. The same reference numbers are used in FIGS. 14A-D to refer to the same or like parts. These devices 1400 are known to include a variety of I/O features such as keypads 1402, microphones 1404, viewing screens and touch screens 1406, speakers 1408 and cameras 1410. Each of these I/O features may be used in the transmission or reception of voice, data, video, etc. These devices 1400 are also capable of being coupled to the Internet wirelessly or by wireline to, inter alia, download idle channel data in the manner described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A method for use in a cognitive radio configured to receive an RF waveform propagating in a predetermined RF spectrum, the RF spectrum having a plurality of predetermined channels, the method comprising:
    performing a Fourier transform of a time domain signal to obtain a series of frequency domain samples covering substantially the entire predetermined RF spectrum, the time domain signal corresponding to the RF waveform, each frequency domain sample being characterized by a predetermined waveform characteristic;
    dividing the series of frequency domain samples into a plurality of subcarrier blocks, each subcarrier block corresponding to one of the plurality of predetermined channels;
    evaluating the predetermined waveform characteristic of each frequency domain sample in each subcarrier block to obtain a subcarrier block activity level for each subcarrier block;
    selecting a subcarrier block when its subcarrier block activity level is greater than a predetermined threshold; and
    assembling selected subcarrier blocks into a message signal, the selected subcarrier blocks corresponding to non-contiguous channels within the plurality of predetermined channels.

2. The method of claim 1, wherein the series of frequency domain samples are comprised of orthogonal frequency division multiplexed (OFDM) signals.

3. The method of claim 1, wherein the series of frequency domain samples are modulated by a predetermined modulation technique to encode the message signal.

4. The method of claim 3, wherein the predetermined modulation technique is selected from a group of modulation techniques that includes frequency shift keying (FSK), phase shift keying (PSK) and quadrature amplitude modulation (QAM).

5. The method of claim 3, wherein one or more frequency domain samples correspond to an information bit.

6. The method of claim 5, wherein the step of evaluating includes comparing the one or more frequency domain samples to obtain a difference value.

7. The method of claim 6, wherein all of the difference values in a subcarrier block are integrated to determine an activity level of the subcarrier block.

8. The method of claim 1, wherein the RF waveform is downconverted to obtain the time domain signal.

9. A cognitive radio device comprising:
    a receiver portion configured to receive an RF signal propagating in a predetermined RF spectrum, the RF spectrum having a plurality of predetermined channels, the receiver portion further comprising a receive Fourier transformer configured to perform a Fourier transform of a time domain signal to obtain a series of frequency domain samples covering substantially the entire predetermined RF spectrum, the time domain signal corresponding to the RF waveform, each frequency domain sample being characterized by a predetermined waveform characteristic;
    an activity detector configured to divide the series of frequency domain samples into a plurality of subcarrier blocks, each subcarrier block corresponding to one of the plurality of predetermined channels, the detector being also configured to evaluate the predetermined waveform characteristic of each frequency domain sample in each subcarrier block to obtain a subcarrier block activity level for each subcarrier block, the detector being further configured to select a subcarrier block when the subcarrier block activity level is greater than a predetermined threshold; and
    a message reassembly portion configured to assemble selected subcarrier blocks into a message signal, the selected subcarrier blocks corresponding to non-contiguous channels within the plurality of predetermined channels.

10. The device of claim 9, wherein the series of frequency domain samples are comprised of orthogonal frequency division multiplexed (OFDM) signals.

11. The device of claim 9, wherein the series of frequency domain samples are modulated by a predetermined modulation technique to encode the message signal.

12. The device of claim 9, wherein the predetermined modulation technique is selected from a group of modulation techniques that includes frequency shift keying (FSK), phase shift keying (PSK) and quadrature amplitude modulation (QAM).

13. The device of claim 9, wherein one or more frequency domain samples correspond to an information bit.

14. The device of claim 13, wherein the step of evaluating includes comparing the one or more frequency domain samples to obtain a difference value.

15. The device of claim 14, wherein all of the difference values in a subcarrier block are integrated to determine an activity level of the subcarrier block.

16. The device of claim 9, wherein the RF waveform is downconverted to obtain the time domain signal.

17. The device of claim 9, further comprising:
    a transmit message assembly portion configured derive a transmission message signal from at least one input device;
    a spectrum sensing portion configured to identify idle subcarrier blocks corresponding to non-contiguous channels within the plurality of predetermined channels;
    a mapping portion configured to encode the transmission message signal into a series of transmit frequency domain samples and map each of the transmit frequency domain samples into an idle subcarrier block;
    a transmit Fourier transformer configured to transform the series of transmit frequency domain samples into a time domain signal corresponding to a transmit RF waveform; and
    a transmitter portion configured to upconvert the time domain signal and transmit the transmit RF waveform.

18. The device of claim 17, wherein the spectrum sensing portion includes the activity detector.

19. The device of claim 17, wherein the spectrum sensing portion is configured to upload channel identification data provided by an external database, the channel identification data including the identity of the idle subcarrier blocks.

20. The device of claim 17, wherein the series of transmit frequency domain samples are comprised of orthogonal frequency division multiplexed (OFDM) signals.

21. The device of claim 20, wherein the series of frequency domain samples are modulated by a predetermined modulation technique to encode the message signal.

22. The device of claim 21, wherein the predetermined modulation technique is selected from a group of modulation techniques that includes frequency shift keying (FSK), phase shift keying (PSK) and quadrature amplitude modulation (QAM).

23. The device of claim 17, wherein the mapping portion is configured to map each of the transmit frequency domain samples into an idle subcarrier block on a symbol-by-symbol basis.

* * * * *